United States Patent
Ohta et al.

(10) Patent No.: US 12,426,083 B2
(45) Date of Patent: Sep. 23, 2025

(54) BASE STATION, TERMINAL, AND WIRELESS COMMUNICATION SYSTEM

(71) Applicant: FUJITSU LIMITED, Kawasaki (JP)

(72) Inventors: Yoshiaki Ohta, Yokohama (JP);
Yoshihiro Kawasaki, Kawasaki (JP);
Takayoshi Ode, Yokohama (JP);
Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 687 days.

(21) Appl. No.: 17/162,369

(22) Filed: Jan. 29, 2021

(65) Prior Publication Data
US 2021/0160920 A1 May 27, 2021

Related U.S. Application Data

(63) Continuation of application No. PCT/JP2018/029848, filed on Aug. 8, 2018.

(51) Int. Cl.
| H04W 74/00 | (2009.01) |
| H04W 74/0833 | (2024.01) |
| H04W 76/27 | (2018.01) |
| H04W 80/02 | (2009.01) |

(52) U.S. Cl.
CPC ..... *H04W 74/006* (2013.01); *H04W 74/0833* (2013.01); *H04W 76/27* (2018.02); *H04W 80/02* (2013.01)

(58) Field of Classification Search
None
See application file for complete search history.

(56) References Cited

U.S. PATENT DOCUMENTS

| 2010/0272035 A1* | 10/2010 | Park | H04W 74/006 370/329 |
| 2011/0317617 A1* | 12/2011 | Sun | H04W 84/047 370/315 |
| 2012/0044897 A1* | 2/2012 | Wager | H04L 1/0039 370/329 |
| 2012/0314652 A1* | 12/2012 | Ahn | H04W 56/0045 370/328 |

(Continued)

FOREIGN PATENT DOCUMENTS

| KR | 20130049561 A * | 5/2013 | .......... H04B 7/0658 |
| WO | 2009/057932 A2 | 5/2009 | |

(Continued)

OTHER PUBLICATIONS

KR 20130049561 (Year: 2013).*

(Continued)

*Primary Examiner* — Christopher T Wyllie
(74) *Attorney, Agent, or Firm* — Myers Wolin, LLC

(57) ABSTRACT

A base station performing random access procedure, the base station includes a transmitter and a controller. The transmitter configured to transmit a protocol data unit which is a signal of the random access procedure and a second signal different from the first signal which is not signal of the random access procedure, the second signal being a downlink control signal of control plane. The controller configured to perform control such that control information is included in the first signal, the control information being for controlling transmission of the second signal.

15 Claims, 23 Drawing Sheets

| R | Timing Advance command | | | Oct 1 |
| Timing Advance command | | TPC | R | Oct 2 |
| Temporary C-RNTI | | | | Oct 3 |
| Temporary C-RNTI | | | | Oct 4 |

(56) References Cited

U.S. PATENT DOCUMENTS

| | | | | |
|---|---|---|---|---|
| 2013/0201960 | A1* | 8/2013 | Kim | H04L 1/1861 |
| | | | | 370/336 |
| 2014/0075189 | A1* | 3/2014 | Abraham | H04W 76/18 |
| | | | | 713/168 |
| 2014/0185595 | A1* | 7/2014 | Wu | H04W 56/00 |
| | | | | 370/336 |
| 2016/0073391 | A1* | 3/2016 | Awad | H04L 1/1864 |
| | | | | 370/329 |
| 2016/0374048 | A1* | 12/2016 | Griot | H04W 4/70 |
| 2017/0013647 | A1* | 1/2017 | Uchino | H04W 74/0833 |
| 2017/0231012 | A1* | 8/2017 | Sung | H04L 1/004 |
| 2018/0132168 | A1* | 5/2018 | Ingale | H04W 72/23 |
| 2018/0139778 | A1* | 5/2018 | Chou | H04W 76/27 |
| 2018/0213452 | A1* | 7/2018 | Kim | H04L 5/0007 |
| 2018/0213556 | A1* | 7/2018 | Rico Alvarino | H04W 68/00 |
| 2018/0279186 | A1* | 9/2018 | Park | H04W 36/302 |
| 2018/0279372 | A1 | 9/2018 | Takeda et al. | |
| 2018/0324869 | A1* | 11/2018 | Phuyal | H04W 76/10 |
| 2019/0098658 | A1* | 3/2019 | Noh | H04L 5/00 |
| 2019/0191464 | A1* | 6/2019 | Loehr | H04W 74/0833 |
| 2019/0254114 | A1* | 8/2019 | Son | H04L 5/001 |
| 2019/0261427 | A1* | 8/2019 | Comstock | H04L 5/001 |
| 2020/0077447 | A1* | 3/2020 | Yang | H04W 74/006 |
| 2020/0146054 | A1* | 5/2020 | Jeon | H04W 74/0833 |
| 2020/0213040 | A1 | 7/2020 | Takeda et al. | |
| 2020/0314917 | A1* | 10/2020 | Jeon | H04W 74/08 |
| 2021/0105824 | A1* | 4/2021 | Lei | H04L 1/1812 |
| 2021/0160920 | A1* | 5/2021 | Ohta | H04W 74/0833 |
| 2022/0053568 | A1* | 2/2022 | Xing | H04W 72/1273 |
| 2023/0397215 | A1* | 12/2023 | Shi | H04W 72/23 |

FOREIGN PATENT DOCUMENTS

| | | |
|---|---|---|
| WO | 2015/115335 A1 | 8/2015 |
| WO | 2016/072215 A1 | 5/2016 |
| WO | 2017/026435 A1 | 2/2017 |

OTHER PUBLICATIONS

Notice of Reasons for Refusal issued by the Japan Patent Office for corresponding Japanese Patent Application No. 2020-535409, dated Apr. 19, 2022, with an English machine translation.
First Notification of Office Action and Search Report issued by the China National Intellectual Property Administration for corresponding Chinese Patent Application No. 201880096205.0, dated Apr. 19, 2023, with an English translation.
Extended European search report with the supplementary European search report, and the European search opinion, issued by the European Patent Office for corresponding European Patent Application No. 18929064.6, dated Jul. 14, 2021.
3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; NG-RAN; NG general aspects and principles (Release 15)", Jun. 2018.

(56) References Cited

OTHER PUBLICATIONS

3GPP TS 38.413 V15.0.0, "3rd Generation Partnership Project; Technical Specification Group Radio Access Network; NG-RAN; NG Application Protocol (NGAP) (Release 15)", Jun. 2018.

3GPP TS 38.420 V15.0.0, "3rd Generation Partnership Project; Technical Specification Group Radio Access Network; NG-RAN; Xn general aspects and principles (Release 15)", Jun. 2018.

3GPP TS 38.423 V15.0.0, "3rd Generation Partnership Project; Technical Specification Group Radio Access Network; NG-RAN; Xn application protocol (XnAP) (Release 15)", Jun. 2018.

3GPP TS 38.470 V15.2.0, "3rd Generation Partnership Project; Technical Specification Group Radio Access Network; NG-RAN; F1 general aspects and principles (Release 15)", Jun. 2018.

3GPP TS 38.473 V15.2.1, "3rd Generation Partnership Project; Technical Specification Group Radio Access Network; NG-RAN; F1 application protocol (F1AP) (Release 15)", Jul. 2018.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHz (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

International Search Report and Written Opinion of the International Searching Authority issued by the Japan Patent Office for corresponding International Patent Application No. PCT/JP2018/029848, mailed on Sep. 18, 2019, with an English translation.

Decision of Refusal issued by the Japan Patent Office for corresponding Japanese Patent Application No. 2020-535409, dated Jun. 28, 2022, with an English machine translation.

* cited by examiner

FIG. 7

| R | Timing Advance command | | Oct 1 |
|---|---|---|---|
| Timing Advance command | | DLA (DL assignment) | Oct 2 |
| DLA (DL assignment) | | | Oct 3 |
| DLA (DL assignment) | | | Oct 4 |
| DLA (DL assignment) | | | Oct 5 |
| Temporary C-RNTI | | | Oct 6 |
| Temporary C-RNTI | | | Oct 7 |

FIG. 8

| Field | Bits |
|---|---|
| Frequency domain resource assignment | 14 |
| Time domain resource assignment | 4 |
| VRB-to-PRB mapping | 1 |
| Modulation and coding scheme | 5 |
| TPC Command | 2 |

Downlink Assignment in RAR

FIG. 10

| Field | Bits |
|---|---|
| Identifier for DCI formats | 1 |
| Frequency domain resource assignment | 14 |
| Random Access Preamble index | 6 |
| UL/SUL indicator | 1 |
| SS/PBCH index | 6 |
| PRACH Mask index | 4 |
| RAR Type | 1 |
| Reserved bits | 9 |

PDCCH masked by RA-RNTI

FIG. 12A

| Field | Bits |
|---|---|
| CQI request | 1 |
| Reserved bits | 2 |

FIG. 12B

| Field | Bits |
|---|---|
| TPC PUCCH | 2 |
| Reserved bits | 1 |

FIG. 12C

| Field | Bits |
|---|---|
| CQI request | 1 |
| TPC PUCCH | 2 |

FIG. 13A

| R | Timing Advance command | | | Oct 1 |
|---|---|---|---|---|
| Timing Advance command | CQI | R | R | Oct 2 |
| Temporary C-RNTI | | | | Oct 3 |
| Temporary C-RNTI | | | | Oct 4 |

FIG. 13B

| R | Timing Advance command | | Oct 1 |
|---|---|---|---|
| Timing Advance command | TPC | R | Oct 2 |
| Temporary C-RNTI | | | Oct 3 |
| Temporary C-RNTI | | | Oct 4 |

FIG. 13C

| R | Timing Advance command | | | Oct 1 |
|---|---|---|---|---|
| Timing Advance command | CQI | TPC | | Oct 2 |
| Temporary C-RNTI | | | | Oct 3 |
| Temporary C-RNTI | | | | Oct 4 |

FIG. 14

| R | Timing Advance command | | Oct 1 |
|---|---|---|---|
| Timing Advance command | | UL grant | Oct 2 |
| UL grant | | | Oct 3 |
| UL grant | | | Oct 4 |
| UL grant | | | Oct 5 |
| Temporary C-RNTI | | | Oct 6 |
| Temporary C-RNTI | | | Oct 7 |

FIG. 15

| Field | Bits |
|---|---|
| Identifier for DCI formats | 1 |
| Frequency domain resource assignment | 14 |
| Random Access Preamble index | 6 |
| UL/SUL indicator | 1 |
| SS/PBCH index | 6 |
| PRACH Mask index | 4 |
| RAR Type | 2 |
| Reserved bits | 8 |

PDCCH masked by RA-RNTI

FIG. 20A

| R | Timing Advance command | | Oct 1 |
| Timing Advance command | | DLA (DL assignment) | Oct 2 |
| DLA (DL assignment) | | | Oct 3 |
| DLA (DL assignment) | | | Oct 4 |
| DLA (DL assignment) | | | Oct 5 |

FIG. 20B

| R | Timing Advance command | | Oct 1 |
| Timing Advance command | | UL grant | Oct 2 |

FIG. 20C

| R | Timing Advance command | | Oct 1 |
| Timing Advance command | | UL grant | Oct 2 |
| UL grant | | | Oct 3 |
| UL grant | | | Oct 4 |
| UL grant | | | Oct 5 |

BASE STATION, TERMINAL, AND WIRELESS COMMUNICATION SYSTEM

CROSS-REFERENCE TO RELATED APPLICATION

This application is a continuation application of International Application PCT/JP2018/029848 filed on Aug. 8, 2018 and designated the U.S., the entire contents of which are incorporated herein by reference.

FIELD

The embodiments discussed herein are related to a base station, a terminal, and a wireless communication system.

BACKGROUND

In a current network, the traffic of mobile terminals (smartphones and feature phones) accounts for a majority of network resources. In addition, the traffic used by mobile terminals tends to expand.

Meanwhile, with development of Internet of a things (IoT) services (e.g., monitoring systems such as a traffic system, a smart meter, and a device), it has been demanded to cope with services including various requirement. Consequently, in communications standards for 5th generation (5G or NR (New Radio)) mobile communication, it has been demanded that, in addition to 4G (4th generation mobile communication) standard techniques, techniques, which achieve a higher data rate, a larger capacity, and lower latency. For the 5th generation communication standards, 3GPP working groups (such as, e.g., TSG-RAN WG1 and TSG-RAN WG2) have been making a progress on technical study and the first version was released in December 2017.

In order to support various kinds of services as described above, the 5G is assumed to support for numerous use cases categorized into, e.g., enhanced mobile broadband (eMBB), massive machine type communications (MTC), and ultra-reliable and low latency communication (URLLC).

In a wireless communication system, a channel for first transmission by a terminal as a mobile station at the start of communication between a base station and the mobile station is prepared. In the 3GPP, this channel is called a random access channel (RACH), and a communication start procedure using the RACH is called a random access procedure. The RACH includes information called a preamble as information for the base station to identify a radio signal transmitted by the mobile station. This information enables the base station to identify the terminal.

The random access procedure is performed in the case of executing an initial access, when a data signal is occurred, the case of establishing synchronization during handover, or other cases. In the random access in the case of executing the initial access or a case where an uplink data signal is occurred, the terminal selects and uses one preamble from multiple preambles (this is referred to as a contention based random access procedure).

In the contention based random access procedure, multiple mobile stations may transmit preambles at the same timing and by using the same RACH resource even with a low probability. On the other hand, in the case of establishing synchronization upon generation of a downlink data signal or in the case of establishing synchronization with a target base station during handover, the random access procedure is performed in a method where the base station allocates a dedicated unique signature to the terminal (this is referred to as non-contention based random access procedure).

The contention based random access procedure will be briefly described. In the contention based random access procedure, first, the terminal starts the random access procedure by transmitting a randomly selected preamble to the base station (referred to as a message 1 or random access preamble). Next, the base station returns a response (referred to as a message 2 or random access response) to the message 1 together with a synchronization signal, transmission permission, and the like for uplink communication.

Subsequently, the terminal transmits a valid mobile station ID or the like to the base station (referred to as a message 3 or scheduled transmission). In a case where a contention of the preamble occurs in the message 1, the base station fails to decode and receive the concerned signal (message 3), and recognizes the occurrence of the contention of the preamble. The base station transmits information on whether or not the message 3 is successfully received to the terminal (referred to as a message 4 or contention resolution). In the contention based random access for executing the initial access, the base station, when successfully receiving the message 3, notifies new uplink transmission using a physical downlink control channel (PDCCH). In a non-contention based random access upon generation of an uplink data signal, the base station, when successfully receiving the message 3, notifies a valid terminal identifier (ID) using a physical downlink shared channel (PDSCH). when the base station fails to receive the message 3, the terminal performs non-adaptive hybrid automatic repeat request (HARQ).

Next, the non-contention based random access procedure will be briefly described. The base station transmits an assignment of a dedicated signature in advance (referred to as a message 0 or random access preamble assignment). The terminal transmits the dedicated preamble using the RACH (referred to as a message 1 or random access preamble). The base station transmits a response signal to the message 1 together with a synchronization signal, transmission permission, and the like for uplink communication (referred to as a message 2 or random access response).

In this way, the terminal and the base station establish synchronization and perform data signal communication. As a for example, downlink data signal transmission by the base station after the non-contention based random access procedure will be described.

After the end of the random access, the uplink synchronization state transitions from the asynchronous state to the synchronous state. The base station transmits a downlink data signal to the mobile station using the PDSCH. The information on the radio resource and modulation and coding scheme (MCS) used by the PDSCH is transmitted with the PDCCH associated with the PDSCH. When the mobile station successfully receives the downlink data signal, the uplink has already transited to the synchronous state, so that the mobile station is enabled to return an acknowledgement (ACK) signal to the base station.

Examples of the related art include 3GPP TS 36.211 V15.2.0, 3GPP TS 36.212 V15.2.1, 3GPP TS 36.213 V15.2.0, 3GPP TS 36.300 V15.2.0, 3GPP TS 36.321 V15.2.0, 3GPP TS 36.322 V15.1.0, 3GPP TS 36.323 V15.0.0, 3GPP TS 36.331 V15.2.2, 3GPP TS 36.413 V15.2.0, 3GPP TS 36.423 V15.2.0, 3GPP TS 36.425 V15.0.0, 3GPP TS 37.340 V15.2.0, 3GPP TS 38.201 V15.0.0, 3GPP TS 38.202 V15.2.0, 3GPP TS 38.211 V15.2.0, 3GPP TS 38.212 V15.2.0, 3GPP TS 38.213

V15.2.0, 3GPP TS 38.214 V15.2.0, 3GPP TS 38.215 V15.2.0, 3GPP TS 38.300 V15.2.0, 3GPP TS 38.321 V15.2.0, 3GPP TS 38.322 V15.2.0, 3GPP TS 38.323 V15.2.0, 3GPP TS 38.331 V15.2.1, 3GPP TS 38.401 V15.2.0, 3GPP TS 38.410 V15.0.0, 3GPP TS 38.413 V15.0.0, 3GPP TS 38.420 V15.0.0, 3GPP TS 38.423 V15.0.0, 3GPP TS 38.470 V15.2.0, 3GPP TS 38.473 V15.2.1 3GPP TR 38.801 V14.0.0, 3GPP TR 38.802 V14.2.0, 3GPP TR 38.803 V14.2.0, 3GPP TR 38.804 V14.0.0, 3GPP TR 38.900 V15.0.0, 3GPP TR 38.912 V15.0.0, and 3GPP TR 38.913 V15.0.0.

SUMMARY

According to an aspect of the embodiments, a base station performing random access procedure, the base station includes a transmitter configured to transmit a protocol data unit which multiplexes a first signal which is a signal of the random access procedure and a second signal different from the first signal which is not signal of the random access procedure, the second signal being a downlink control signal of control plane; and a controller configured to perform control such that control information is included in the first signal, the control information being for controlling transmission of the second signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a first example of a MAC RAR structure in Embodiment 4;

FIG. 8 is an example of a configuration of downlink control information to be included in a random access signal in Embodiment 4;

FIG. 10 is an example of a configuration of downlink control information accompanying a random access signal in Embodiment 4;

FIGS. 12A, 12B and 12C are examples of configurations of control information included in a random access signal in Embodiment 4;

FIGS. 13A, 13B and 13C are examples of specific MAC RAR structures in the second example of Embodiment 4;

FIG. 14 is an example of a MAC RAR structure included in the RAR signal;

FIG. 15 is an example of a configuration of downlink control information accompanying a random access signal in Embodiment 4;

FIGS. 20A, 20B and 20C are diagrams illustrating examples of MAC RAR structures in Embodiment 5;

DESCRIPTION OF EMBODIMENTS

There is a demand to reduce a delay amount of data signal communication in a wireless communication system. For example, a delay amount is demand, which enables supporting URLLC services assumed in the 5G. Thus, a method is demanded to reduce a delay amount until data signal transmission even when a data signal is occurred in a situation where the terminal and the base station are in out of synchronous state.

The disclosed technology has been made in view of the above discussion, and an object thereof is to reduce a delay amount until data signal transmission.

Hereinafter, embodiments will be described in detail with reference to the accompanying drawings. The problems and the embodiments in the present specification are mere examples and are not intended to limit the scope of the present disclosure. For example, although technically equivalent things or matters are described with different expressions, the techniques of the present disclosure may be applied even to the different expressions, and these are not intended to limit the scope of the present disclosure. Some of the embodiments may be combined as appropriate as long as the combination does not make contradiction in the processing.

Terms used or technical contents described in the present specification may be expressed as appropriate by using terms used or technical contents described in the specifications and contributions as the standards on communication in 3GPP or the like. Such specifications include, for example, 3GPP TS 38.211 V15.2.0.

Embodiment 1

Embodiment 1 is an example in which a signal for performing synchronization processing and a data signal are transmitted by being multiplexed or concatenated between a base station and a terminal. For example, the data signal and a signal (or message) of random access procedure used for synchronization processing to which control information of the data signal is added are transmitted, or the data signal and a control signal association with the signal of random access procedure (signal for performing a synchronization processing) to which the control information of the data signal is added are transmitted. For example, the signal for performing the synchronization processing may be referred to as a first signal, and a data signal may be referred to as a second signal.

Figure 1:
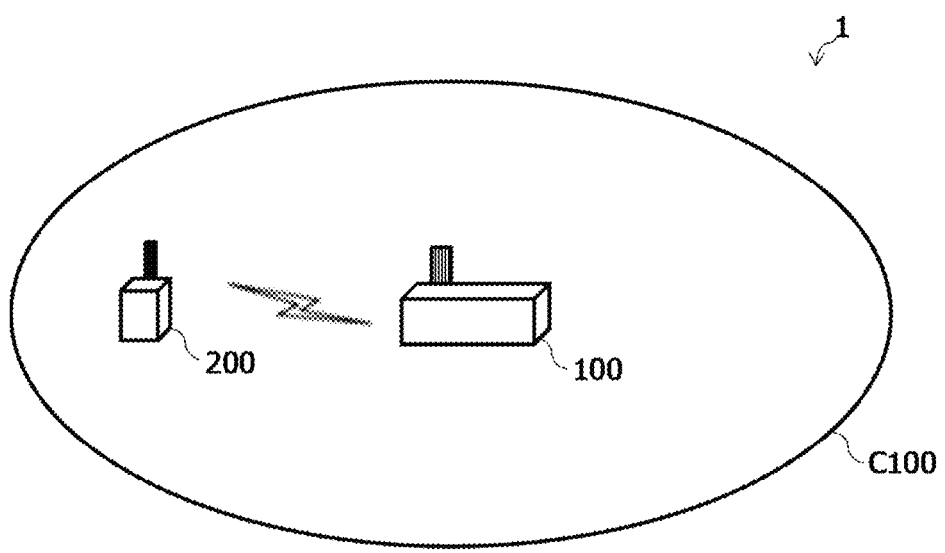
FIG. 1 is a diagram illustrating an example of a network configuration of Embodiment 1.

A wireless communication system 1 of Embodiment 1 is illustrated in FIG. 1. A wireless communication system 1 includes a base station 100 and a terminal 200. The base station 100 forms a cell C10. Here, the terminal 200 is located in the cell C10. The base station 100 may be, for example, any of wireless base stations in various scales such as a macro wireless base station or a small-size wireless base station such as a pico wireless base station (including a micro wireless base station, a femto wireless base station, or the like) or the like, and may be rephrased as a wireless communication apparatus, a communication apparatus, a transmission apparatus, or the like. The terminal 200 may be, for example, a wireless terminal such as a mobile phone, a smartphone, a personal digital assistant (PDA), a personal computer, and any of various devices or apparatuses (such as sensor devices) having a wireless communication function for a vehicle and the like, and may be rephrased as a wireless communication apparatus, a communication apparatus, a reception apparatus, a mobile station, or the like.

The base station 100 is connected to a network 2 via a wired line and a not-illustrated network apparatus (a higher-level apparatus or another base station). The base station 100 may be connected to the network apparatus via a wireless line instead of the wired line.

The base station 100 may include separate apparatuses, one of which has functions for wireless communication with the terminal 200 and the other of which has digital signal processing and controlling functions. In this case, the apparatus having the wireless communication functions is referred to as a remote radio head (RRH), and the apparatus having the digital signal processing and controlling functions is referred to as a base band unit (BBU). The RRH may be installed projecting from the BBU, and the RRH and the BBU may be connected to each other by a wired line such as an optical fiber. Alternatively, the RRH and the BBU may be wirelessly connected to each other. Instead of the RRH and the BBU described above, two separate apparatuses called a central unit and a distributed unit may be employed, for example. The distributed unit includes at least a radio frequency (RF) wireless circuit. The distributed unit may include a wireless physical layer (or Layer 1) function, a MAC-layer function, and an RLC function in addition to the RF wireless circuit.

On the other hand, the terminal 200 communicates with the base station 100 through wireless communication. In a case where the terminal 200 is not synchronized with the base station 100, the terminal 200 is able to establish synchronization with the base station 100 using a random access procedure.

Figure 2:
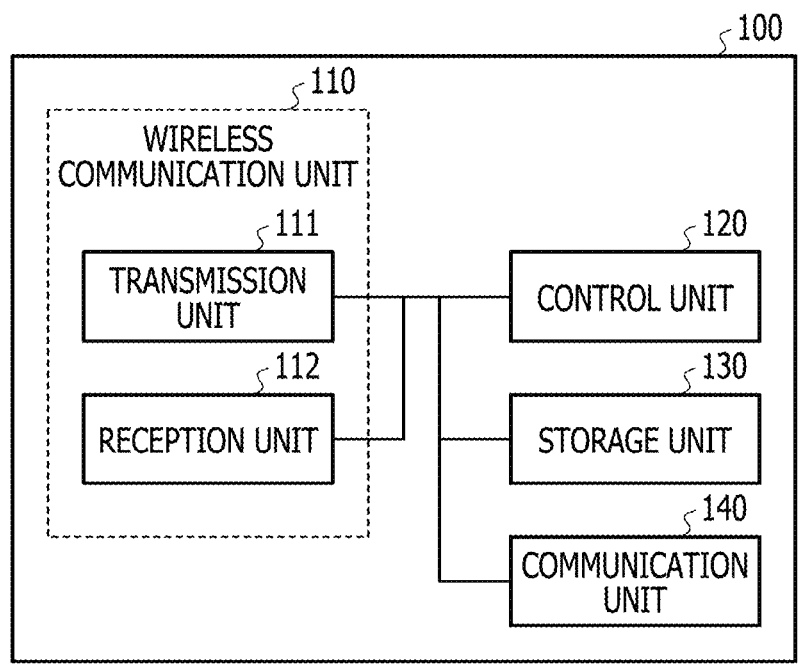
FIG. 2 is an example of a functional configuration diagram of a base station in a wireless communication system of Embodiment 1.

Next, the base station 100 will be described. An example of a functional block configuration of the base station 100 is illustrated in FIG. 2. The base station 100 includes a wireless communication unit 110, a control unit 120, a storage unit 130, and a communication unit 140.

The wireless communication unit 110 includes a transmission unit 111 and a reception unit 112, and performs wireless communication with the terminal 200. For example, the transmission unit 111 is capable of transmitting, to the terminal 200, a signal for the random access procedure, a downlink data signal, a downlink control signal (hereinafter, also referred to as a physical downlink control channel (PDCCH)), and a control signal containing control information for the signal for the random access procedure and/or the downlink data signal. The reception unit 112 is capable of receiving a signal for the random access procedure, an uplink data signal, and an uplink control signal, which are transmitted from the terminal.

The control unit 120 controls the base station 100. For example, the control unit 120 is capable of controlling the execution of the random access procedure in out of synchronized state with the terminal 200, signal processing on signals received by the reception unit 112, creation of transport blocks (TB), mapping of the transport blocks to the radio resources, and the like. An example of the generation of a transport block is to generate one transport block containing a downlink data signal stored in the storage unit 130 and a message to be used in the random access procedure.

The storage unit 130 is capable of storing, for example, a downlink data signal.

The communication unit 140 is connected to and communicates with a network apparatus (for example, a higher-level apparatus or another base station apparatus) through a wired or wireless line. The storage unit 130 is capable of storing a data signal addressed to the terminal 200 and received by the communication unit 140.

Figure 3:
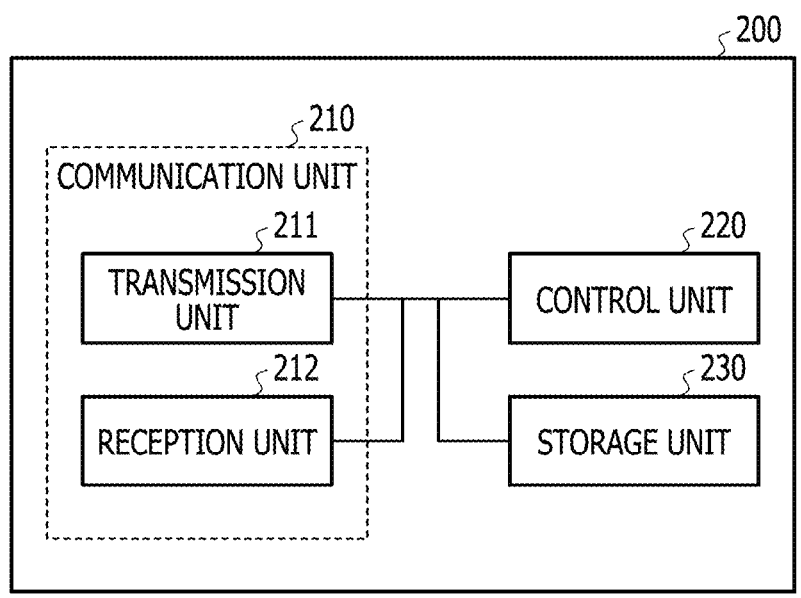
FIG. 3 is an example of a functional configuration diagram of a terminal in the wireless communication system of Embodiment 1.

Next, the terminal 200 will be described. FIG. 3 is an example of a functional configuration diagram of the terminal 200 in the wireless communication system of Embodiment 1. As illustrated in FIG. 3, the terminal 200 includes a communication unit 210, a control unit 220, and a storage unit 230. These constituent units are coupled to each other in such a manner that signals and data may be input and output in one direction or both directions. The communication unit 210 may be described as separate units named a transmission unit 211 and a reception unit 212.

The transmission unit 211 transmits a data signal and a control signal through an antenna by wireless communication. The antenna may be common to transmission and reception. The transmission unit 211 transmits, for example, a signal for the random access procedure, an uplink data signal, an uplink control signal (hereinafter, also referred to as physical uplink control channel (PUCCH)), and a response signal to a downlink data signal.

The reception unit 212 receives a data signal and a control signal transmitted from the base station 100 via the antenna. The reception unit 212 receives, for example, a signal for the random access procedure, a downlink data signal, a downlink control signal (hereinafter, also referred to as a physical downlink control channel (PDCCH)), a control signal containing control information for the signal for the random access procedure and/or the downlink data signal, and the like. The received signals include, for example, a reference signal used for channel estimation or demodulation.

The control unit 220 controls the terminal 200. For example, the control unit 220 is capable of controlling the execution of the random access procedure in out of synchronized state with the base station 100, signal processing on signals received by the reception unit 212, creation of transport blocks (TB), mapping of the transport blocks to the radio resources, and the like.

The storage unit 230 is capable of storing, for example, an uplink data signal. The storage unit 230 is capable of storing setting information concerning the wireless communication, which is transmitted from the base station 100.

Figure 4:
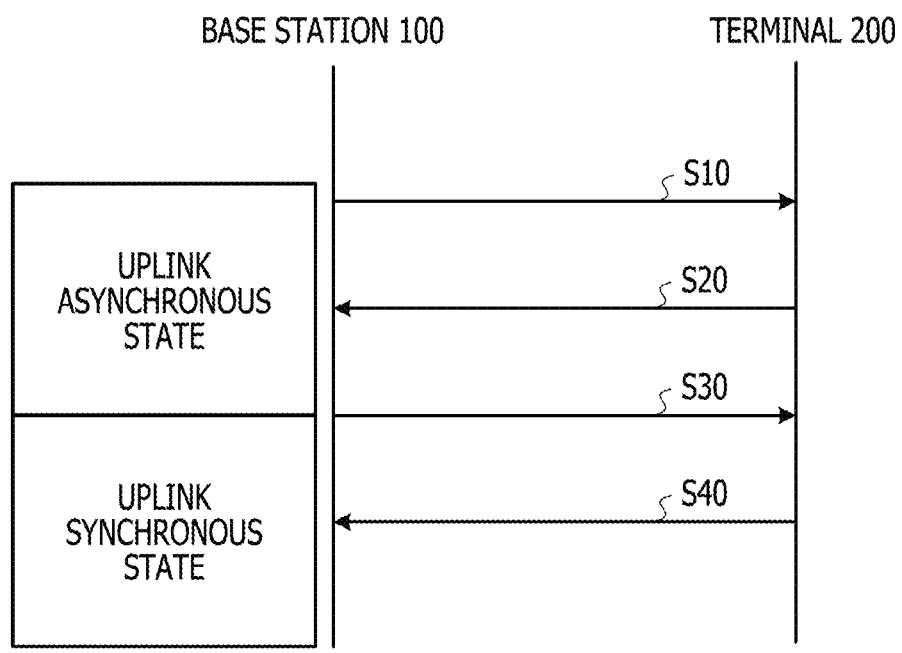
FIG. 4 is an example of a sequence diagram including a random access procedure in the wireless communication system of Embodiment 1.

FIG. 4 is a diagram illustrating an example of a sequence including the random access procedure in the wireless communication system according to Embodiment 1. FIG. 4 is a sequence diagram using an example in which a downlink data signal is occurred in a state where the base station 100 and the terminal 200 are asynchronous with each other (uplink asynchronous state), and explaining processes up to a step in which the terminal 200 transmits a response signal (ACK signal or negative acknowledgement (NACK) signal) to the downlink data signal.

When a data signal is occurred in out of synchronized state, the base station 100 starts the random access procedure (non-contention based random access procedure) for synchronizing with the terminal 200. First, the transmission unit 111 of the base station 100 transmits an assignment of a dedicated preamble (signature) in advance as a message 0 (or random access preamble assignment: RAPA), and the reception unit 212 of the terminal 200 receives the message 0 (S10). Hereinafter, the message 0 (or random access preamble assignment: RAPA) is referred to as a RAPA (random access preamble assignment) signal.

Next, the transmission unit 211 of the terminal 200 transmits the dedicated preamble as a message 1 (or RAP: random access preamble), and the reception unit 112 of the base station 100 receives the message 1 (S20). Hereinafter, the message 1 (or RAP: random access preamble) is referred to as a RAP (random access preamble) signal.

After the RAP signal is received, the transmission unit 111 of the base station 100 transmits a response signal to the message 1 together with a synchronization signal, a transmission permission, and the like for uplink communication as a message 2 (random access response: RAR), and also transmits the occurred downlink data signal. The reception unit 212 of the terminal 200 receives the message 2 and the downlink data signal (S30). Hereinafter, the message 2 (random access response: RAR) is referred to as a RAR (random access response) signal.

For example, the control unit 220 assembles a transport block containing the RAR signal and the downlink data signal, and maps the assembled transport block to a radio resource for transmitting the assembled transport block. The control information for the downlink data signal is transmitted while being included in the control information for the RAR signal or in the RAR signal.

When the transmission and reception of the RAR signal succeed, the uplink between the base station 100 and the terminal 200 transitions from the asynchronized state to the synchronized state.

The transmission unit 211 of the terminal 200 transmits a response signal (an ACK signal or a NACK signal) to the downlink data signal received by the reception unit 212, and the reception unit 112 of the base station 100 receives the response signal (S40). The control unit 120 of the base station 100 performs a HARQ process according to the received response signal.

In this manner, the signal (or message) used for the random access procedure and the data signal are multiplexed and transmitted, so that the time until the downlink data signal transmission is shortened. In short, it is possible to reduce the delay amount until the downlink data signal transmission. It is possible that the control information for the data signal may be transmitted while being included in the control information for the message 2 or in the message 2. Therefore, the terminal 200 is enabled to decode the downlink data signal and transmit a response signal from the transmission unit 211.

According to the first embodiment described above, a signal for performing the synchronization processing (a signal used for the random access procedure) and a data signal are transmitted by being multiplexed or concatenated between the base station and the terminal, so that the delay amount may be reduced. For example, compared the data signal transmission in the random access procedure described in Embodiment 1 with the random access procedure in the related art, the former can achieve shorter delay in the data signal transmission. For example, since the data signal is transmitted while being included in the random access procedure, it is possible to achieve a reduction in the time until the downlink data signal, which is scheduled and transmitted after the completion of establishment of the uplink synchronization in the random access procedure in the related art. The downlink data may be either user plane data or control plane data.

Embodiment 2

Embodiment 1 has described the example in which a signal for performing the synchronization processing and a data signal are transmitted by being multiplexed or concatenated between the base station and the terminal. Embodiment 2 will describe an example in which the base station 100 and the terminal 200 perform communication using a band that does not require a license (hereinafter, referred to as an unlicensed band). The same configurations of the wireless communication system 1, the base station 100, and the terminal 200 as those in Embodiment 1 will be described with the same reference signs given thereto. Descriptions of the same processes as those in the wireless communication system 1, the base station 100, and the terminal 200 in Embodiment 1 will be omitted.

First, an unlicensed band will be described. The unlicensed band is a band that does not require a license, and therefore is available to various vendors. In short, for example, there is a possibility that different vendors communicate using the same frequency resource in the unlicensed band. For this reason, in order to perform communication in an unlicensed band, carrier sensing (CS) is performed before signal transmission. For example, when the base station 100 performs transmission to the terminal 200 in the unlicensed band, the control unit 120 of the base station 100 performs control to conduct carrier sensing in the unlicensed band, and transmits a signal from the transmission unit 111 after confirming that any other communication apparatus is not performing communication using the unlicensed band.

Since the carrier sensing is inevitable for communication using the unlicensed band, for example, when performed in the unlicensed band, there is a problem that the number of timing to perform carrier sensing increases and the delay amount increases according to the number of times of the carrier sensing. For example, in a period from the non-contention based random access procedure to the subsequent data signal transmission, the carrier sensing has to be conducted before each of the transmissions of the RAPA signal, the RAR signal, and the subsequent data signal from the base station 100. In the terminal 200, the carrier sensing has to be conducted before each of the transmissions of the RAP signal and the response signal to the data signal from the transmission unit 211. The control unit 220 may control the carrier sensing of the terminal 200.

Figure 5:
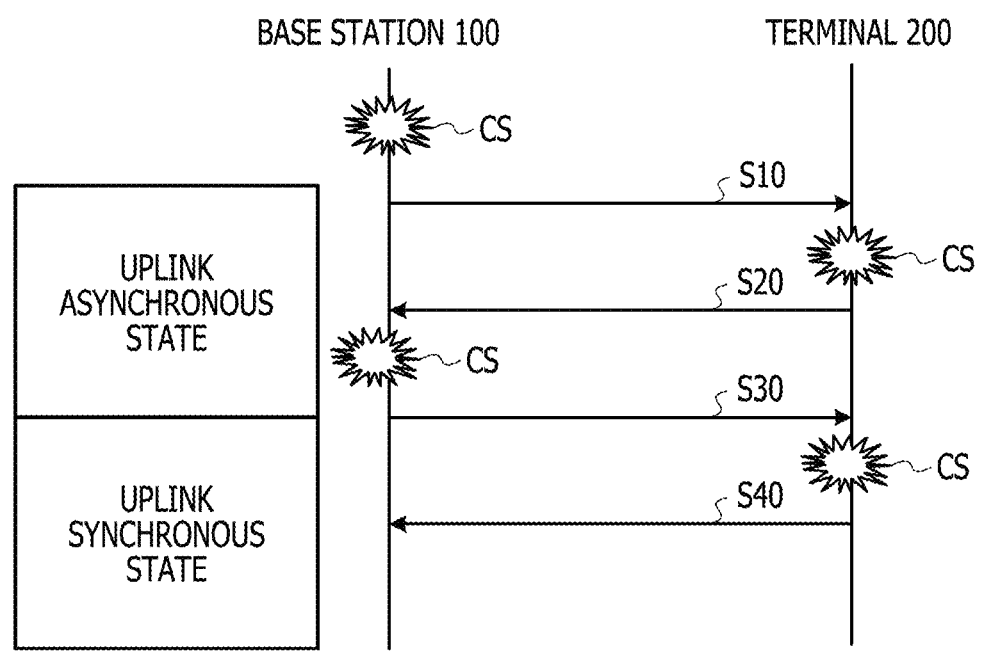
FIG. 5 is an example of a sequence diagram including a random access procedure in a wireless communication system of Embodiment 2.

FIG. 5 is a diagram illustrating an example of a sequence including a random access procedure in the wireless communication system 1 of Embodiment 2. The sequence in FIG. 5 is a sequence diagram in a case where the base station 100 and the terminal 200 communicate using an unlicensed band. The same processes as in Embodiment 1 will be described using the same step numbers.

When a data signal is occurred in out of synchronized state, the base station 100 starts the random access procedure (non-contention based random access procedure) in order to get synchronized with the terminal 200. First, before the transmission unit 111 transmits the RAPA signal, the base station 100 performs carrier sensing (CS in the drawing) to check whether or not another communication apparatus is communicating in the unlicensed band for use to transmit of the RAPA signal. In the determination on whether or not a signal is present in the carrier sensing, for example, the reception unit 112 tries to receive a signal, in the unlicensed band, and the control unit 120 measures the signal intensity in the unlicensed band, and determines whether or not the signal is present according to whether or not there is power equal to or higher than a prescribed value in the unlicensed band. Alternatively, for example, a detection unit (not illustrated) may be additionally equipped to detect a signal. If the control unit 120 determines that there is no signal after the carrier sensing, the transmission unit 111 transmits the RAPA signal, and the reception unit 212 of the terminal 200 receives the RAPA signal (S10).

Next, before the transmission unit 211 transmits the RAP signal, the terminal 200 performs the carrier sensing (CS in the drawing) to check whether or not another communication apparatus is communicating in the unlicensed band used to transmit the message 1. In the determination on whether or not a signal is present in the carrier sensing, for example, the reception unit 212 tries to receive a signal, in the unlicensed band, and the control unit 220 measures the signal intensity in the unlicensed band, and determines whether or not the signal is present according to whether or not there is power equal to or higher than a prescribed value in the unlicensed band. Alternatively, for example, a detection unit (not illustrated) may be additionally equipped to detect whether or not a signal is present. If the control unit 220 determines that there is no signal after the carrier sensing, the transmission unit 211 of the terminal 200 transmits the RAP signal, and the reception unit 112 of the base station 100 receives the RAP signal (S20).

After the reception unit 112 receives the RAP signal and before the transmission unit 111 transmits the RAR signal, the base station 100 conducts the carrier sensing in the unlicensed band used for the transmission and transmits the occurred downlink data signal together with the RAR signal at a timing when there is no signal in the unlicensed band. The reception unit 212 of the terminal 200 receives the RAR signal and the downlink data signal (S30). For example, the control unit 220 assembles a transport block containing the RAR signal and the downlink data signal, and maps the assembled transport block to a radio resource for transmitting the assembled transport block. The control information for the downlink data signal is transmitted while being contained in the control information for the RAR signal or in the RAR signal.

When the transmission and reception of the RAR signal succeed, the base station 100 and the terminal 200 may transit uplink state from out of synchronized state to the synchronized state.

Before the transmission unit 211 transmits a response signal (an ACK signal or a NACK signal) to the downlink data signal received by the reception unit 212, the terminal 200 conducts the carrier sensing to check whether or not another communication apparatus is communicating in the unlicensed band used to transmit the response signal and transmits the response signal from the transmission unit 211 at a timing when there is no signal in the unlicensed band. The reception unit 112 of the base station 100 receives the response signal (S40). The control unit 120 of the base station 100 performs a HARQ process according to the received response signal.

In this manner, in communication using an unlicensed band, a signal (or a message) used for the random access procedure and a data signal are multiplexed (or concatenated) and transmitted, so that the number of times of carrier sensing until the data signal transmission may be reduced. For example, when the RAR signal and the downlink data signal are transmitted at different timings as in the related art, the carrier sensing has to be conducted at both the timing of transmitting the RAR signal and the timing of transmitting the downlink data signal. In short, the carrier sensing has to be conducted twice. On the other hand, when the method described in Embodiment 2 is used, the RAR signal and the downlink data signal are multiplexed (or concatenated) and transmitted, and thus the carrier sensing is performed only once for the transmission of the RAR signal and the downlink data signal. Embodiment 2 has been described on the assumption that signal transmission and reception succeed.

According to Embodiment 2 described above, a signal for performing the synchronization processing (a signal used for the random access procedure) and the data signal are transmitted by being multiplexed or concatenated between the base station and the terminal in the unlicensed band, so that the delay amount may be reduced. For example, a signal (or a message) used for the random access procedure and a data signal are multiplexed and transmitted, so that a delay amount may be reduced as compared with the random access procedure in the related art. For example, since the data signal is transmitted while being included in the random access procedure, for example, it is possible to achieve a reduction in the time until transmission of the downlink data signal that is scheduled and transmitted after the completion of establishment of the uplink synchronization in the random access procedure in the related art, and a reduction in the number of times of the carrier sensing in the random access procedure in the related art. Therefore, compared with the effectiveness in the licensed band, the effectiveness in unlicensed band becomes large because the delay for the carrier sensing may also be cut in the unlicensed band. The downlink data may be either user plane data or control plane data.

Embodiment 3

Embodiment 1 has described the example in which a signal for performing the synchronization processing and a data signal are transmitted by being multiplexed or concatenated between the base station and the terminal. Embodiment 2 has described the example in which a signal for performing the synchronization processing and a data signal are transmitted by being multiplexed or concatenated between the base station and the terminal. Embodiment 3 will describe an example of consecutive transmissions in the random access procedure in the wireless communication system 1 of Embodiment 2. The same configurations of the wireless communication system 1, the base station 100, and the terminal 200 as those in Embodiments 1 and 2 will be described with the same reference signs given thereto.

Descriptions of the same processes as those of the wireless communication system 1, the base station 100, and the terminal 200 in Embodiments 1 and 2 will be omitted.

Figure 6:
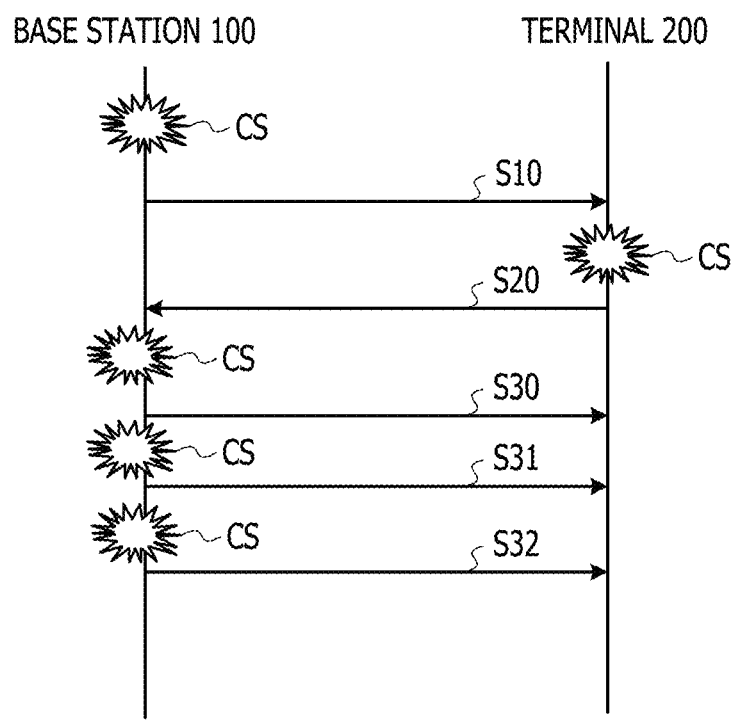
FIG. 6 is an example of a sequence diagram including a random access procedure in a wireless communication system of Embodiment 3.

FIG. 6 is an example of a sequence diagram including a random access procedure in a wireless communication system of Embodiment 3. The sequence diagram in FIG. 6 is a sequence diagram when the base station 100 and the terminal 200 communicate using an unlicensed band. The same processes as in Embodiment 2 will be described using the same step numbers and the like. In FIG. 6, description will be given on the assumption that the number of repetitive transmissions is three.

In the sequence diagram in FIG. 6, the processes up to step S30 are the same as those in the sequence in FIG. 5, and therefore description thereof is omitted. It is assumed that step S30 is the first transmission in repetitive transmission.

Also in a case of the repetitive transmissions where the RAR signal together with the downlink signal are transmitted consecutively, the base station 100 has to conduct the carrier sensing before each transmission. Therefore, in step S30, the control unit 120 performs control to conduct the carrier sensing after the RAR signal and the downlink data signal are transmitted.

When the control unit 120 determines that the signal transmission is possible as a result of the carrier sensing, the transmission unit 111 of the base station 100 transmits the signals (the RAR signal and the downlink data signal) in the second transmission of the consecutive transmissions (S31). Thereafter, the control unit 120 performs control to conduct the carrier sensing again. When the control unit 120 determines that the signal transmission is possible as a result of the carrier sensing, the transmission unit 111 transmits the signals (the RAR signal and the downlink data signal) in the third transmission in the consecutive transmissions (S32). The transition to the uplink synchronized state is at a timing when the terminal 200 normally receives the RAR signal and the downlink data signal.

Although the description with reference to FIG. 6 uses the example in which the carrier sensing is conducted before each of the steps of performing the consecutive transmissions, the number of times of carrier sensing may be further reduced by, for example, shortening the intervals between steps S30 and S31 (setting a predetermined interval (for example, 4 ms)). Once the signal transmission is determined to be possible after the carrier sensing is conducted, consecutive signal transmissions are allowed within a predetermined interval. For this reason, the number of times of the carrier sensing may be reduced.

According to Embodiment 3 described above, a signal for performing the synchronization processing (a signal used for the random access procedure) and a data signal are transmitted by being multiplexed or concatenated between the base station and the terminal in the unlicensed band, so that the delay amount may be reduced. It is also possible to improve the reception performance (reliability) of the downlink data signals by multiplexing and consecutively transmitting the signals (or messages) used for the random access procedure and the data signals. Since the control information to be used for the downlink data signal is associated with the signal used for the random access procedure, it is also possible to reduce the overhead of the control information.

Embodiment 3 has been described based on the wireless communication system 1 of Embodiment 2, but is also applicable to the wireless communication system of Embodiment 1. For example, the reliability of the RAR signal and the downlink data signal may be improved by performing multiple times of the transmissions of the RAR signal and the downlink data signal in Embodiment 1 (corresponding to step S30 in FIG. 4). The downlink data may be either user plane data or control plane data.

Embodiment 4

Embodiments 1 to 3 have described the example in which a signal for performing the synchronization processing and a data signal are transmitted by being multiplexed or concatenated between the base station and the terminal. Embodiment 4 will describe a specific method of transmitting control information for a downlink data signal. Embodiment 4 will be described based on Embodiment 1, but is also applicable to the wireless communication system 1 of any of Embodiments 2 and 3.

First, an example in which control information for a downlink data signal is stored in an RAR signal in Embodiment 4 will be described (hereinafter, referred to as a first method). FIG. 7 illustrates a first example of a structure (medium access control random access response (MAC RAR)) of a MAC (medium access control) SDU (service data unit) of an RAR signal. FIG. 7 is an example in which a reserved bit (R in the drawing) is 1 bit, a timing advance command (Timing Advance command in the drawing) is 12 bits, control information for a downlink data signal (DLA (DL assignment) in the drawing) is 27 bits, and a temporary C-RNTI (radio network temporary identifier) value (Temporary C-RNTI) is 16 bits.

The control information for the downlink data signal (DLA (DL assignment) in the drawing) has to include at least one of information on frequency resource allocated to the downlink data signal (PDSCH frequency resource allocation), information on time resource allocated to the downlink data signal (PDSCH time resource allocation), and modulation information for the downlink data signal (MCS (modulation and coding scheme)). Although FIG. 7 illustrates the example in which the control information for the downlink data signal (DLA (DL assignment) in the drawing) is 27 bits, for example, 8 bits (1 octet) can be eliminated if 19 bits or less are sufficient to cover the control information for the downlink data signal (DLA (DL assignment) in the drawing). In short, although FIG. 7 illustrates the example of 7 octets, the RAR signal may contain 6 octets or less depending on the number of bits in the control information.

In order to notify the terminal of transmission of the RAR signal including the control information for the downlink data signal, the base station 100 notifies the terminal 200 of a type of the RAR signal by using 1 bit in the reserved bits in a downlink control information format (DCI format (for example, DCI format 1_0)). For example, the control unit 220 of the terminal 200 determines that a RAR signal having the structure illustrated in FIG. 7 will be received when the reserved bit indicates "1". Alternatively, the notification may be performed with any DCI format in the related art in which the RAR Type field described above is not set. In this case, the control unit 120 sets the reserved bit (R in the drawing) in the RAR field to "1" to enable the type of the RAR signal to be identified.

Next, details of control information for a downlink data signal will be described. FIG. 8 illustrates an example of control information for a downlink data signal (DLA (DL assignment) in the drawing) to be stored in an RAR signal. In the example illustrated in FIG. 8, the downlink control signal information contains 26 bits in total, which include 14 bits of information on frequency resource allocated to the downlink data signal (frequency domain resource assignment), 4 bits of information on time resource allocated to the downlink data signal (time domain resource assignment), 1 bit of information on mapping between a virtual resource block and a physical resource block (VRB-to-PRB mapping), 5 bits of modulation information for the downlink data signal (modulation and coding scheme), and 2 bits of information on uplink power control (TPC command) as information on uplink communication. The information on the uplink power control is left because the information is useful for appropriately securing the coverage of the PUCCH.

Regarding the power setting, for example, the base station receives the RAP signal, and sets the power of the PUCCH with reference to the level of the received signal. This setting is preferably made such that the ACK reception quality over the PUCCH will be higher than the reception quality of the preamble (the RAP signal). Therefore, it is preferable to set the quality (power) higher than the quality obtained at the reception of the preamble. Since the example of the format illustrated in FIG. 7 includes 27 bits, for example, the remaining 1 bit may be used as a reserved bit.

In addition to the information described above, the information of the downlink control information (DCI) includes information for the downlink signal such, for example, as identification information of a downlink control information format (Identify for DCI formats), information indicating whether or not the signal is new data (new data indicator), and HARQ process number information (HARQ process number), and includes information for the uplink signal including information of uplink control signal resource information (PUCCH resource) and HARQ timing information (HARQ Timing). However, the above-listed information is omitted in the example in FIG. 8, because the priority is given to the important information (for example, the information on frequency resource allocated to the downlink data signal (PDSCH frequency resource allocation), the information on time resource allocated to the downlink data signal (PDSCH time resource allocation), and the modulation information for the downlink data signal (MCS (modulation and coding scheme)) under the constraint of the limited resources. For example, regarding HARQ-related information, there is an alternative method of securing the reception performances of the downlink data signal by repeatedly transmitting the signals of transmission timing which the RAR signal and the data signal are transmitted (corresponding to step S30). There is also a method of associating the radio resource to be used by the PUCCH with the resource of the PDCCH in such a way that the transmission timing of the PUCCH for receiving the acknowledgement response to the downlink data signal is set in advance (for example, the transmission timing is set to 4 ms after the RAR reception by a radio resource control message (RRC) or by hard-coding (predefining) in the standard specifications). Therefore, the HARQ-related control information is deleted.

Figure 9:
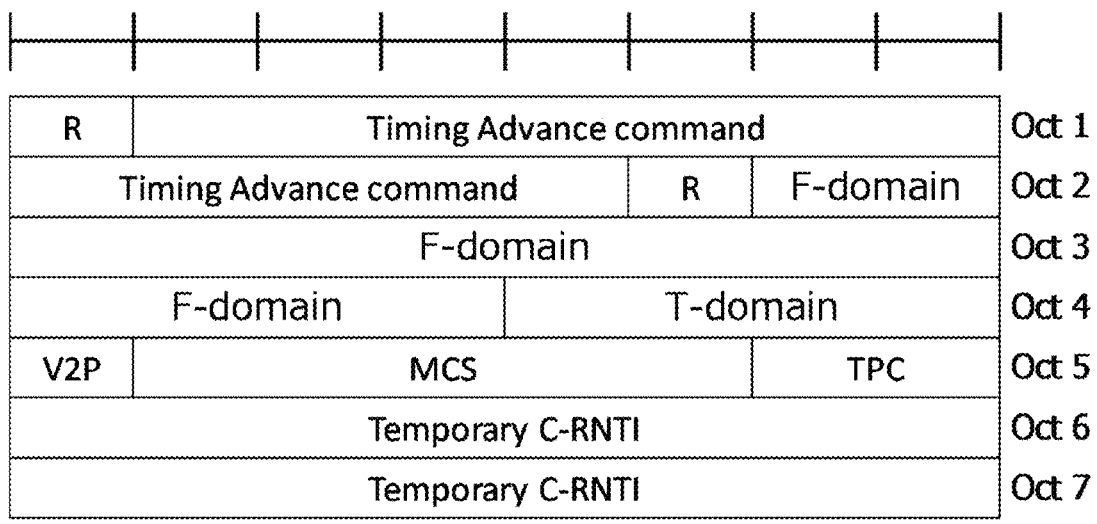
FIG. 9 is an example of a specific MAC RAR structure in the first example of Embodiment 4.

FIG. 9 illustrates a structural example of a MAC SDU configuration of RAR 2 (MAC RAR) including respective control information described with reference to FIG. 8. FIG. 9 is an example of details of the control information (DLA (DL assignment in the drawing) illustrated in FIG. 7. The reserved bit is set at the head of the control information (DLA (DL assignment) in the drawing) (the sixth bit in Oct with the smallest number (Oct 2)). In the above manner, the base station 100 is capable of storing the control signal for the downlink data signal in the RAR signal. As a result, the RAR signal and the downlink data signal may be transmitted collectively (while being concatenated or multiplexed). Therefore, the delay amount until the data signal transmission may be reduced.

Next, an example will be described in which the control information for the downlink data signal is indicated by using the control information for the RAR signal (hereinafter, referred to as a second method). As a format of the control information for the random access response, for example, the existing DCI_Format 1_0 may be employed with information added thereto, or a new DCI_Format may be defined according to the following description.

FIG. 10 illustrates an example of control information for an RAR signal in the second method of Embodiment 4. The information illustrated in FIG. 10 presents an example in which a downlink control information format identifier (identifier for DCI formats) is 1 bit, information on assigned frequency resource (frequency domain resource assignment) is 14 bits, a random access preamble value (random access preamble index) is 6 bits, an uplink/supplemental uplink identifier (UL/SUL indicator) is 1 bit, search space/PBCH value (SS/PBCH index) is 6 bits, a PRACH mask value (PRACH Mask index) is 4 bits, a random access type (RAR Type) is 1 bit, and the reserved bits are 9 bits. Note that 1 bit of the random access type (RAR Type) is information specifying the structure of a random access response, where, for example, a random access type (RAR Type) of "1" indicates use of a format for multiplexing the RAR signal and the data signal.

Figure 11:
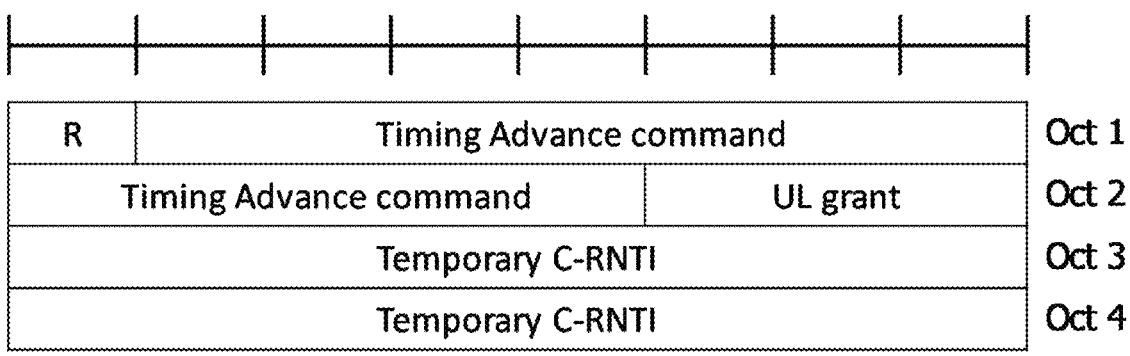
FIG. 11 is a second example of a MAC RAR structure in Embodiment 4.

In the example of the second method, the amount of information included in the RAR signal may be reduced by consecutively allocating the resource for the RAR signal and the resource for the downlink data signal on the frequency axis or the time axis, and, for example, may be reduced by 27 bits of the DLA illustrated in FIG. 7. The reduction by 27 bits results in a 3-bit increase in the reserved bits. An example of utilization of these 3 bits of the reserved bits will be described. FIG. 11 illustrates an example of a structure of a MAC SDU structure (MAC RAR) in consideration of utilization of 3 bits of the reserved bits. In a case where the above 3 bits are used as the reserved bits in FIG. 11, 3 bits of the uplink grant (UL grant) illustrated in FIG. 11 are used as the 3 bits of the reserved bits.

FIG. 11 is an example in which a reserved bit (R in the drawing) is 1 bit, a timing advance command (Timing Advance command in the drawing) is 12 bits, an uplink grant (UL grant in the drawing) is 3 bits, and a temporary C-RNTI value (Temporary C-RNTI) is 16 bits. It is possible to cut the allocation information for the downlink data signal (such as, for example, the modulation information for the data signal (MCS (modulation and coding scheme)) by setting the same allocation information as that for the RAR signal (by using the control information for the RAR signal). For example, the RAR signal and the downlink data signal are modulated using the same modulation information.

Next, a specific method of utilizing the uplink grant illustrated in FIG. 11 will be described. FIGS. 12A to 12C illustrate examples of structure of 3 bits of the uplink grant. FIGS. 12A to 12C illustrate the examples of the configurations including 1 bit of a channel quality information (CQI) request and 2 bits of reserved bits, including 2 bits of uplink power control information (transmission power control (TPC) command) and 1 bit of a reserve bit, and including 1 bit of a CQI request and 2 bits of uplink power control information. FIGS. 13A to 13C illustrate specific examples in which FIGS. 12A to 12C are applied to the uplink grant illustrated in FIG. 11. The CQI request is used in the case where a downlink data signal is considered to be generated in future. Using the CQI request, it is possible to grasp the downlink radio quality, and accordingly set the optimum MCS for the subsequent downlink communication.

Specifying the power control on the PUCCH enables the response signal corresponding to the downlink data signal to be transmitted with nearly optimum power and ensures the appropriate coverage. The first and second methods described above are intended to cut the DL Assignment field. However, if the size of the random access response is considered to be unimportant, the RAR signal may contain all the fields of a downlink control information format (for example, the DCI Format 1_0 (for DL data)) described, for example, in 3GPP TS38.212 V15.1.1 (2018-04) Section 7.3.1).

In addition to the first example (corresponding to FIG. 7) and the second example (corresponding to FIG. 11), a MAC SDU structure (MAC RAR) in an RAR signal in which 27 bits are for the uplink as illustrated in FIG. 14 may be used by switching with the control information for the RAR signal. FIG. 14 illustrates an example of the MAC RAR structure included in the RAR signal, the example including 1 bit of a reserved bit (R in the drawing), 12 bits of a timing advance command (Timing Advance command in the drawing), 27 bits of an uplink grant (UL grant in the drawing), and 16 bits of a temporary C-RNTI value (Temporary C-RNTI in the drawing) as described in 3GPP TS 38.321 V15.2.0 Section 6.2.3.

FIG. 15 illustrates an example of control information that enables multiple formats of random access responses to be changed from one to another. FIG. 15 illustrates the example in which the random access type (RAR Type) is changed to 2 bits and the reserved bits (Reserved bits) are changed to 8 bits in the information illustrated in FIG. 10.

For example, a random access type (RAR Type) of "00" indicates a MAC RAR format corresponding to FIG. 14, a random access type (RAR Type) of "01" indicates a MAC RAR format corresponding to FIG. 7, and a random access type (RAR Type) of "10" indicates a MAC RAR format corresponding to FIG. 11. In this way, any one of the MAC RAR formats may be used by switching. Therefore, it is possible to perform flexible radio resource allocation and efficiently use the radio resources. The control unit 120 of the base station 100 may generate the control information in these formats.

Figure 16A:
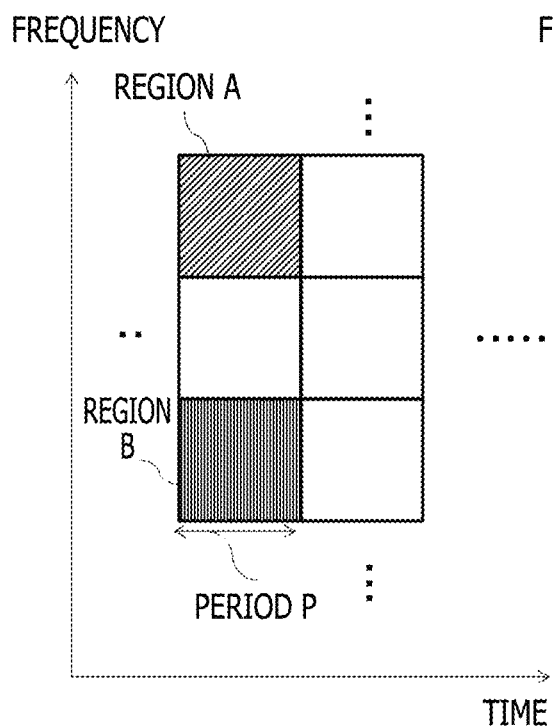
FIGS. 16A and 16B are examples of allocation of a random access signal and a data signal to radio resources in Embodiment 4.
Figure 16B:
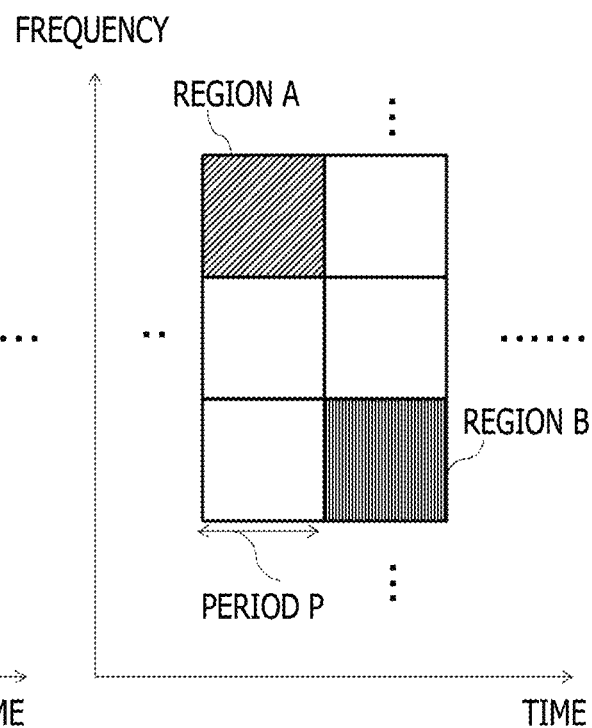
Figure 17A:
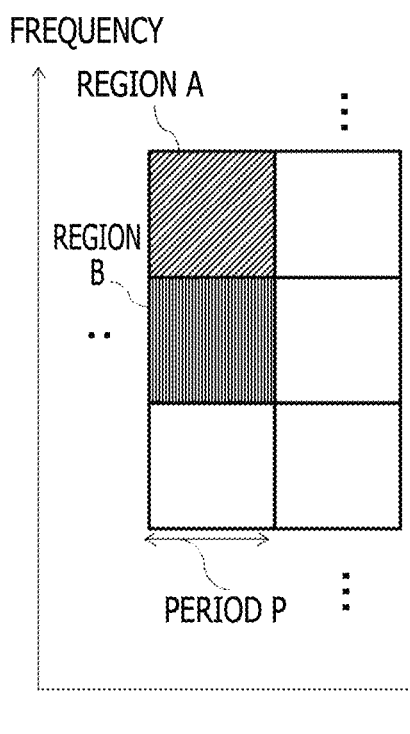
FIGS. 17A and 17B are examples of allocation of a random access signal and a data signal to radio resources in Embodiment 4.
Figure 17B:
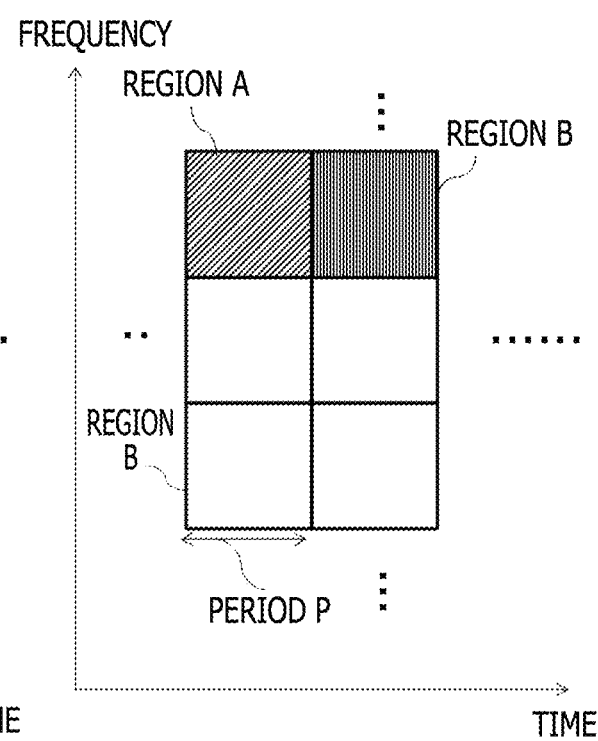

FIGS. 16A and 16B and FIGS. 17A and 17B illustrate examples of mapping to radio resources. FIGS. 17A and 17B illustrate an example in which an RAR signal (region A in the drawing) and a downlink data signal (region B in the drawing) are consecutive in the frequency direction within the same period P (for example, a slot, a mini slot, a subframe, or the like), and an example in which a random access response signal (region A in the drawing) and a downlink data signal (region B in the drawing) are consecutive in the time axis direction (using consecutive periods P) at the same frequency, respectively. FIGS. 16A and 16B illustrate an example in which an RAR signal (region A in the drawing) and a downlink data signal (region B in the drawing) are not consecutive in the frequency direction within the same period P, and an example in which a random access response signal (region A in the drawing) and a downlink data signal (region B in the drawing) are consecutive in the time axis direction (using consecutive periods P) at different frequencies, respectively.

When the first method is used, it is possible to perform the mapping illustrated in FIGS. 16A and 16B and FIGS. 17A and 17B with the random access response signal, and thus it is possible to perform flexible mapping to the radio resources. On the other hand, when the second method is used, it is possible to perform mapping in FIGS. 17A, and 17B in which the signals are consecutive on the frequency or time axis. However, the second method may reduce the size (MAC RAR) of the RAR signal.

According to Embodiment 4 described above, a signal for performing the synchronization processing (a signal used for the random access procedure) and a data signal are transmitted by being multiplexed or concatenated between the base station 100 and the terminal 200, so that a delay amount may be reduced. For example, a signal (or a message) used for the random access procedure and a data signal may be multiplexed and consecutively transmitted, and a delay amount may be reduced as compared with the random access procedure in the related art. The control information for the data signal may be associated with a signal (or a message) used for the random access procedure or control information that controls the signal used for the random access procedure. Embodiment 4 has been described based on the wireless communication system of Embodiment 1, but is also applicable to the wireless communication system 1 described in any of Embodiments 2 and 3. It is to be noted that, in the case of applying to an unlicensed band where a signal (or a message) used for the random access procedure and a data signal are multiplexed, for example, by using each of consecutive periods P (for example, mapping in FIG. 17B), the carrier sensing has to be conducted at time intervals between which the consecutive transmissions are allowed after the carrier sensing.

Embodiment 5

Embodiments 1 to 3 have described the example in which a signal for performing the synchronization processing and a data signal are transmitted by being multiplexed or concatenated between the base station and the terminal. Embodiment 4 has described the specific method of transmitting the control information for a downlink data signal. Embodiment 5 will describe the format of a control signal for a signal including a RAR signal. Embodiment 5 will be described based on the wireless communication system 1 described in Embodiments 1 and 4.

Figure 18A:
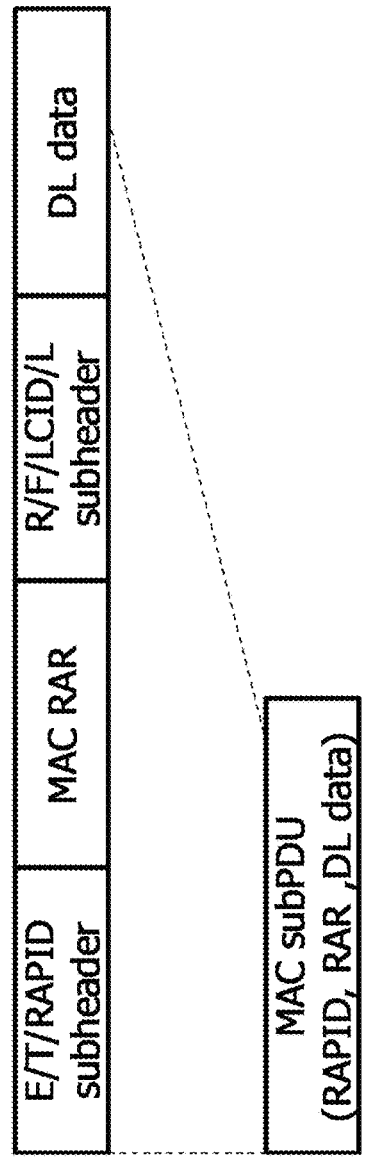
FIGS. 18A and 18B are examples of MAC PDU structures each including MAC PDU including a random access signal (MAC RAR)
Figure 18B:
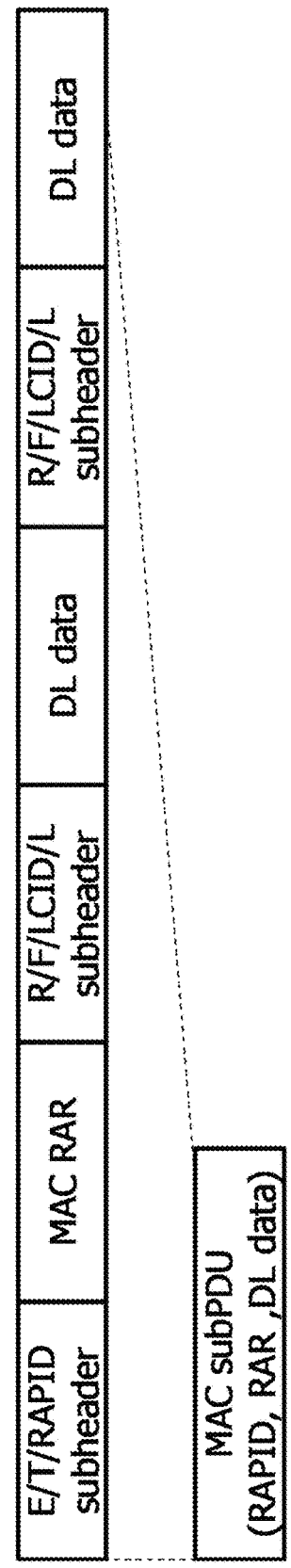

FIGS. 18A and 18B illustrate examples of a structure of a media access control protocol data unit (MAC PDU) in Embodiment 5. FIG. 18A is the example in which a single data signal is multiplexed with an RAR signal, and FIG. 18B is the example in which multiple (two in the drawing) data signals are multiplexed with an RAR signal. The MAC RAR in FIGS. 18A and 18B stores, for example, the MAC SDU (MAC RAR) of the random access response as illustrated in FIGS. 7, 9, 11, 13, and 14 described in Embodiment 4.

First, transmission of a downlink control signal will be described. When the base station 100 transmits a downlink control signal, the control unit 120 of the base station 100 generates downlink control information (PDCCH (physical downlink control channel)) including cyclic redundancy check (CRC) bits masked or scrambled by the identification information of the terminal 200 (C-RNTI) or the identification information of a random access signal (random access-radio network temporary identifier). Usually, in the case of the random access procedure, this CRC is performed according to the identification information of the RAR signal.

Description herein will be given to the case of the random access procedure in which a downlink control signal is generated using a cyclic redundancy check (CRC) masked or scrambled with the identification information (C-RNTI) of the terminal 200.

Figure 19:
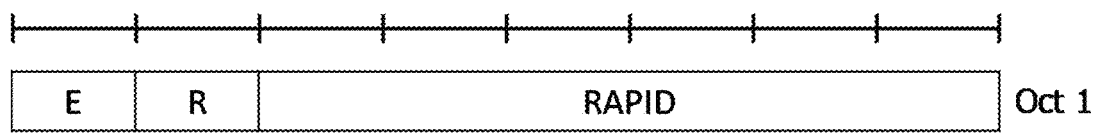
FIG. 19 is an example of a structure of a subheader of a random access response signal (MAC RAR) in a MAC PDU including the random access response signal (MAC RAR)

FIG. 19 illustrates a structural example of a subheader of a random access response signal in the MAC PDU including the random access response signal. The subheader of the random access response signal corresponds to E/T/RAPID subheader in FIG. 18. In FIG. 18, E, T, and RAPID correspond to an extension field (E-field), a type field, and a random access preamble identifier field (the random access preamble identifier field), respectively. The extension field (E-field) is usually a field indicating multiple RAPIDs. In the case where the PDCCH is masked or scrambled by a terminal unique identifier, however, the base station 100 makes the notification to the terminal 200 by using the extension field (E-field).

When the control unit 120 masks or scrambles the control signal (PDCCH) associated with the RAR signal by the identifier (C-RNTI) of the terminal 200, the control unit 120 may cut the Temporary C-RNTI in MAC RAR. This cutting is possible because the identification information of the terminal 200 (C-RNTI) is already used for the masking or scrambling.

FIGS. 20A to 20C are diagrams illustrating examples of MAC RAR structures in Embodiment 5. FIGS. 20A, 20B, and 20C illustrate the structures of the MAC RAR structures in which the Temporary C-RNTI in the MAC RAR in FIGS. 7, 11, and 14 is cut.

In this way, it is possible to reduce the number of octets of the MAC RAR. For example, as a result of comparing the MAC RAR structures in FIG. 20A and FIG. 7, it is seen that the number of octets in the structure in FIG. 20A is reduced by 2 octets.

Although FIGS. 20A to 20C illustrate the MAC RAR structures in which the Temporary C-RNTI is cut, the structure of the MAC RAR may store different information instead of the Temporary C-RNTI. For example, the control information for a downlink data signal (DLA), the uplink allocation information (UL grant), or the like may be assigned to octets from which the Temporary C-RNTI is cuttable.

In this manner, it is possible to struct the MAC RAR including the control information for the downlink data signal (DLA) and the uplink allocation information (UL grant). However, since the Temporary C-RNTI is composed of 16 bits while the uplink allocation information (UL grant) is composed of, for example, 27 bits as illustrated in FIG. 14, the uplink allocation information (UL grant) is inevitably reduced by 11 bits. Alternatively, a structure including the control information for the downlink data signal (DLA) and the uplink allocation information (UL grant) may be formed in 43 bits. In this case, the configuration is formed within 43 bits, for example, by using MCS common to the downlink data signal and the uplink data signal, defining the Time domain resource assignment in a manner to have relation between the downlink and uplink (for example, setting an uplink transmission timing to 4 ms after reception of a downlink data), or doing the like. In this way, the information on the uplink data allocation and the downlink data allocation may be transmitted in the RAR signal.

An operation of the terminal 200 in the above case will be described. The reception unit 212 of the terminal 200 receives the PDCCH which is the PDCCH masked or scrambled by the terminal unique identifier.

Next, the control unit 220 receives and decodes the PDSCH in the field specified by the PDCCH, and analyzes the MAC subheader in the MAC PDU. Here, if the head bit is "0", the control unit 120 determines that the subheader is any one of a short data signal subheader, a long data signal subheader, and a MAC CE/UL CCCH subheader. See 3GPP TS 36.321 V15.2.0 and 3GPP TS 38.321 V15.2.0 for these three structures. The head bit in each of these three subheaders is "0" because the reserved bit (R) is present at a place corresponding to the extension field (E-field) in FIG. 18.

On the other hand, if the head bit is 1, which means that the E bit is "1", the control unit 120 recognizes that an RAR signal including a specific data signal (multiplexed or concatenated) is received.

When the control unit 220 recognizes the random access signal including the data signal, the control unit 220 performs an operation of processing the MAC SDU in any of the formats illustrated in FIGS. 18A and 18B.

In this manner, even when the PDCCH is masked or scrambled using the terminal unique identifier, the terminal 200 is enabled to receive the RAR signal and the data signal.

According to Embodiment 5 described above, a signal for performing the synchronization processing (a signal used for the random access procedure) and a data signal are transmitted by being multiplexed or concatenated between the base station 100 and the terminal 200, and thus a delay amount may be reduced. For example, a signal (or a message) for use in the random access procedure and a data signal may be multiplexed and transmitted, and thus a delay amount may be reduced as compared with the random access procedure in the related art. The PDCCH may be masked or scrambled using a terminal unique identifier. Embodiment 5 has been described based on the wireless communication system 1 of Embodiment 1 or 4, but is also applicable to the wireless communication system 1 described in any of Embodiments 2 and 3. For example, Embodiment 5 is applicable to Embodiment 2 or 3 by using the same subheader format in the unlicensed band.

Embodiment 6

Embodiments 1 to 5 have been described based on the example in which a signal for performing the synchronization processing and a data signal are transmitted by being multiplexed or concatenated between the base station and the terminal. Embodiment 6 will describe an example in which a signal for performing the synchronization processing and a signal other than a downlink data signal (for example, control information of the control plane, a NAS message, an RRC message, or the like) are transmitted by being multiplexed or concatenated between a base station and a terminal. Embodiment 6 will be described based on the wireless communication system 1 described in Embodiment 1 or 4, or the like. In the following description, a signal other than a downlink data signal is described by using an RRC message, but is not limited thereto.

Figure 21:
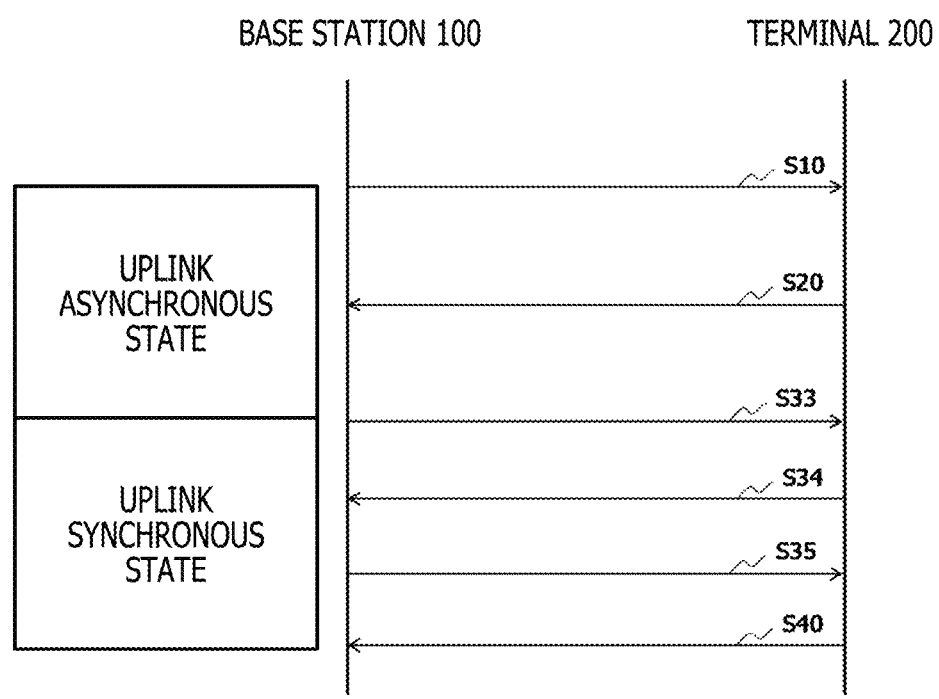
FIG. 21 is an example of a sequence diagram including a random access procedure in Embodiment 6.

FIG. 21 is an example of a sequence diagram including a random access procedure in a wireless communication system of Embodiment 6. The sequence diagram in FIG. 21 is a sequence diagram in a case where the base station 100 and the terminal 200 communicate using a licensed band. The same processes as in Embodiment 1 will be described using the same step numbers and the like.

In the sequence diagram of FIG. 21, the processes up to step S20 are the same as those in FIG. 4, and thus description thereof is omitted. After receiving the RAP signal from the terminal 200, the base station 100 multiplexes or concatenates an RRC message with an RAR signal and transmits the resultant signal from the transmission unit 111 to the terminal 200 (S33). In short, the terminal 200 receives the signal in which the RAR signal and the RRC message are multiplexed or concatenated (or contained in one transport block). At step S33 described above, information on the RRC message (for example, information indicating a resource for the RRC message, whether the RRC message is multiplexed or not, and the like) may be stored in the bits of the control information (DLA) for the MAC RAR or the uplink grant (UL grant) described in FIGS. 7, 20, and others. Alternatively, the RRC message is notified by system information. The RRC message is, for example, an RRC Reconfiguration message.

After the reception unit 212 receives the signal in which the RAR signal and the RRC message are multiplexed or concatenated (or contained in one transport block) and the control unit 220 completes the configuration of RRC (successfully sets the RRC), the transmission unit 211 of the terminal 200 transmits a response signal (RRC complete message) to the RRC message to the base station 100 (S34).

After the response signal to the RRC message is received, the transmission unit 111 of the base station 100 transmits a downlink data signal (S35).

After the reception unit 212 receives the downlink data signal, the transmission unit 211 of the terminal 200 transmits a response signal to the downlink data signal to the base station 100 (S40).

The manner described above enables a signal other than the downlink data signal (for example, an RRC message) and a signal used for the random access procedure to be transmitted by being multiplexed or concatenated, and therefore makes it possible to shorten a time from generation of the downlink data in out of synchronized state to transmission of the downlink data. For example, in the related art, in a case where RRC setup is requested, a message for the RRC setup is transmitted after the random access procedure. In Embodiment 6, since the RAR signal and the message for configuring RRC are multiplexed or concatenated and transmitted, it is possible to shorten the time until the downlink data transmission as compared with the related art. It is noted that Embodiment 6 and any of the other Embodiments may be combined, and the three kinds of downlink signals, namely, the RAR signal, the message for configuring RRC, and the downlink data may be transmitted in one step. In short, the base station 100 may multiplex or concatenate the RAR signal, the message for configuring RRC, and the downlink data, and transmit the resultant signal. In this case, for example, the resource for the downlink data or the message for configuring RRC may be specified by the control signal that accompanies the RAR signal, or the resource for the downlink data or the message for the RRC setup may be specified by using the field of the control information (DLA, UL grant, or the like) or the Temporary-RNTI in the MAC RAR presented in FIGS. 7, and 20, and others. It is noted that the Temporary-RNTI field may be used in the case where the control signal (PDCCH) associated with the RAR signal is masked or scrambled by the C-RNTI.

Embodiment 6 has been described based on the wireless communication system 1 of Embodiment 1 or 4, but is also applicable to the wireless communication system 1 described in any of Embodiments 2 and 3. For example, an RAR signal and an RRC message may be multiplexed or concatenated and transmitted in an unlicensed band. Embodiment 6 may be combined with the features in Embodiment 5. For example, the reserved bit of the subheader in FIG. 19 described in Embodiment 5 may be used as a field indicating a signal multiplexed. In short, the E-field in FIG. 19 may specify whether or not an RAR signal and another signal are multiplexed, and the reserved bit may specify the type of the latter signal. The E-field and the reserved bit in FIG. 19 may be combined to specify four kinds of information (an RAR signal, the multiplexing of an RAR signal and an RRC message, the multiplexing of an RAR signal, and downlink data, and the multiplexing of an RAR signal, an RRC message, and downlink data). The MAC RAR described in Embodiment 4 may be used in Embodiment 6 or a combination of Embodiment 2, 3, or 5 and Embodiment 6 described above.

Others Embodiments

Embodiments 1 to 6 have described the examples in which a downlink data signal is multiplexed or concatenated with an RAR signal in a non-contention based random access. However, the present disclosure may be implemented in any manner not limited to the above. For example, the format of the MAC RAR described in Embodiment 4 may be applied to an RAR signal (message 2) or the message 4 in a case where downlink data is generated during the contention based random access. It is also possible to multiplex an uplink data signal with a signal (for example, the message 3) during the non-contention based random access. In this case, the base station 100 has to allocate a resource for uplink data by using the RAR signal, and permit the transmission in the message 3.

(Hardware Configurations of Apparatuses in Wireless Communication System of Each Embodiment)

Hardware configurations of the apparatuses in the wireless communication system of each embodiment or each modification example will be described based on FIGS. 22 and 23.

Figure 22:
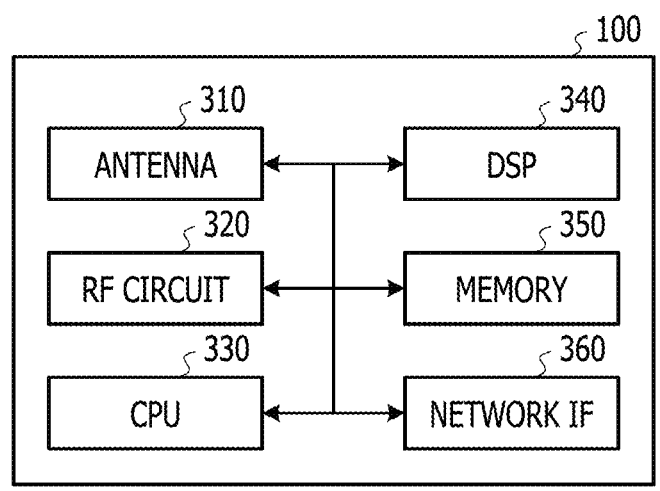
FIG. 22 is an example of a hardware configuration diagram of a base station in a wireless communication system.

FIG. 22 is a diagram illustrating a hardware structure of the base station 100. As illustrated in FIG. 22, the base station 100 includes, for example, a radio frequency (RF) circuit 320 including an antenna 310, a central processing unit (CPU) 330, a digital signal processor (DSP) 340, a memory 350, and a network interface (IF) 360 as hardware components. The CPU is coupled via a bus such that various signals and data signals may be input and output. The memory 350 includes at least any one of, for example, a random-access memory (RAM) such as a synchronous dynamic random-access memory (SDRAM), a read-only memory (ROM), and a flash memory, and stores programs, control information, and data signals.

Description will be given of correspondences between the functional structure of the base station 100 illustrated in FIG. 2 and the hardware structure of the base station 100 illustrated in FIG. 22. The transmission unit 111 and the reception unit 112 (or the communication unit 140) are implemented by, for example, the RF circuit 320, or the antenna 310 and the RF circuit 320. The control unit 120 is implemented by, for example, the CPU 330, the DSP 340, the memory 350, a digital electronic circuit (not illustrated), and the like. An example of the digital electronic circuit is an application-specific integrated circuit (ASIC), a field-programming gate array (FPGA), a large scale integration (LSI), or the like.

The base station 100 may also generate multiple data signals to be transmitted in multiple sub-bands. In this case, filters that generate these signals may be structed independently of each other for the respective sub-bands.

Figure 23:
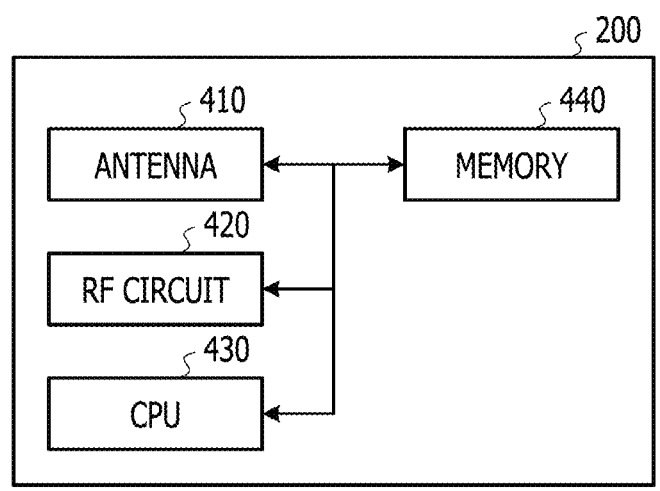
FIG. 23 is an example of a hardware configuration diagram of a terminal in a wireless communication system.

FIG. 23 is a diagram illustrating a hardware structure of the terminal 200. As illustrated in FIG. 23, the wireless terminal 200 includes, for example, an RF circuit 420 including an antenna 410, a CPU 430, and a memory 440 as hardware components. The wireless terminal 200 may include a display device such as a liquid crystal display (LCD) coupled to the CPU 430. The memory 440 includes at least any one of, for example, a RAM such as a SDRAM, a ROM, and a flash memory, and stores programs, control information, and data signals.

Description will be given of correspondences between the functional structure of the wireless terminal 200 illustrated in FIG. 3 and the hardware structure of the wireless terminal 200 illustrated in FIG. 23. The transmission unit 211 and the reception unit 212 (or the communication unit 210) are implemented by, for example, the RF circuit 420, or the antenna 410 and the RF circuit 420. The control unit 220 is implemented by, for example, the CPU 430, the memory 440, a digital electronic circuit (not illustrated), and the like. An example of the digital electronic circuit is an ASIC, a FPGA, an LSI, or the like, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station performing random access procedure, the base station comprising;
   a transmitter configured to transmit a protocol data unit which multiplexes a first signal which is a signal of the random access procedure and a second signal different from the first signal which is not a signal of the random access procedure, the second signal being a downlink control signal of control plane; and
   a controller configured to perform control such that control information is included in the first signal, the control information controlling transmission of the second signal, wherein the first signal is a random access response signal, and the second signal is the downlink control signal and a signal of RRC (Radio Resource Control) layer, wherein
   the random access response signal does not include information on frequency and time resource for uplink data, and
   the random access response signal does include information on uplink power control.

2. The base station according to claim 1, wherein the random access procedure is a non-contention based random access procedure.

3. The base station according to claim 1, wherein
   the controller performs carrier sensing on a transmission band before transmission of the first signal and the second signal, and
   the transmitter transmits the first signal and the second signal according to a result of the carrier sensing.

4. The base station according to claim 1, wherein the transmitter is configured to consecutively transmit the protocol data unit a predetermined number of times.

5. The base station according to claim 1, wherein
   the controller performs to include type information of the random access response signal in a control signal associated with the first signal, and
   the transmitter transmits the control signal.

6. The base station according to claim 1, wherein the controller generates the first signal of a MAC PDU structure having less than 7 octets.

7. The base station according to claim 1, wherein the information on uplink power control is a transmission power control (TPC) command.

8. The base station according to claim 1, wherein the controller performs control such that the control information is masked or scrambled by using an identifier of another wireless communication apparatus to which the first signal and the second signal are to be transmitted.

9. The base station according to claim 8, wherein the controller performs control such that a subheader to contain information indicating whether or not a random access signal is stored.

10. A terminal performing random access procedure, the terminal comprising;
    a receiver configured to receive a protocol data unit which multiplexes a first signal which is a signal of the random access procedure and a second signal different from the first signal and which is not a signal of the random access procedure, the second signal being a downlink control signal of control plane; and
    a controller configured to perform a reception process for the second signal according to the first signal in which control information is included, the control information controlling transmission of the second signal, wherein
    the first signal is a random access response signal, and
    the second signal is the downlink control signal and a signal of RRC (Radio Resource Control) layer, wherein
    the random access response signal does not include information on frequency and time resource for uplink data, and
    the random access response signal does include information on uplink power control.

11. The terminal according to claim 10, wherein the reception process generates a response signal to the second signal.

12. The terminal according to claim 10, wherein
    the receiver receives the control information being masked or scrambled by using an identifier of a wireless communication apparatus, and
    the controller identifies a presence or an absence of a random access signal according to information indicating whether or not the random access signal included in a subheader is stored.

13. The terminal according to claim 10, wherein the information on uplink power control is a transmission power control (TPC) command.

14. A wireless communication system comprising:
    a first wireless communication apparatus; and
    a second wireless communication apparatus configured to perform a random access procedure between the first wireless communication, wherein
    the first wireless communication apparatus includes:
    a transmitter configured to transmit a protocol data unit which multiplexes a first signal which is a signal of the random access procedure and a second signal different from the first signal and which is not a signal of the random access procedure, the second signal being a downlink control signal of control plane, and
    a first controller configured to perform control such that control information is included in the first signal, the control information a.for controlling transmission of the second signal, and
    the second wireless communication apparatus includes:
    a receiver configured to receive the protocol data unit, and a controller configured to perform a reception process for the second signal according to the first signal, wherein the first signal is a random access response signal, and the second signal is the downlink control signal and a signal of RRC (Radio Resource Control) layer, wherein the random access response signal does not include information on frequency and time resource for uplink data, and the random access response signal does include information on uplink power control.

15. The wireless communication system according to claim 14, wherein the information on uplink power control is a transmission power control (TPC) command.

* * * * *